United States Patent [19]

Simmons

[11] Patent Number: 4,910,829
[45] Date of Patent: Mar. 27, 1990

[54] POULTRY CROPPER AND NECK BREAKER

[76] Inventor: Lacy Simmons, 101 Simmons Industrial Blvd., Dallas, Ga. 30132

[21] Appl. No.: 282,032

[22] Filed: Dec. 9, 1988

[51] Int. Cl.⁴ ............................................. A22C 21/00
[52] U.S. Cl. ............................................ 17/11; 17/12
[58] Field of Search ............................ 17/11, 12, 11.3

[56] References Cited

U.S. PATENT DOCUMENTS

| 3,750,231 | 8/1973 | Schrender | 17/11 |
| 3,803,669 | 4/1974 | Dillon | 17/11 |
| 4,117,570 | 10/1978 | Meyn | 17/11 |
| 4,516,290 | 5/1985 | Uanmil | 17/11 |
| 4,574,427 | 3/1986 | Harben, Jr. et al. | 17/12 |
| 4,619,017 | 10/1986 | Simmons | 17/11 |
| 4,704,768 | 11/1987 | Hutting et al. | 17/11 |
| 4,707,886 | 11/1987 | Simmons | 17/11 |

Primary Examiner—Willis Little
Attorney, Agent, or Firm—Eric P. Schellin

[57] ABSTRACT

There is disclosed a combination crop remover and neck breaker for use as part of a continuous processing station adjacent a conventional poultry processing line wherein partially processed poultry is given a two step processing treatment. The station includes a plurality of modules that are moved in synchronization with the poultry line. The modules egage the upside down hanging birds in a clasping fashion. The modules have a neck breaker means and a probe means for entering the backside of a bird through a previously cut opening for the purpose. The probe under the aegis of a vacuum and structural features entwines the crop and other viscera and removes same when the probe is withdrawn. The probe is then cleansed of the viscera when the module has been moved to another location at its station. The so-treated poultry is permitted to continue on its path in the processing line.

16 Claims, 10 Drawing Sheets

POULTRY CROPPER AND NECK BREAKER

BACKGROUND OF THE INVENTION

The invention is directed to a poultry processing apparatus and more specifically to an improved cropper and neck breaker assembly. The neck is held in place against an anvil by a pivotable aligning and holding assembly. A relatively sharp hammer portion is then thrust against the neck, breaking it, without completely severing the neck skin. At the same time a vertically disposed probe enters the poultry through a vent opening which has been previously cut thereinto. The probe is connected to rotating means and a source of vacuum; the probe has suitably disposed openings therein to permit entrapment of portions of the cropper of the poultry to thereby grasp the cropper and to withdraw it when the probe is withdrawn from the poultry through the said vent opening. The poultry may then be released for further processing.

DESCRIPTION OF THE PRIOR ART

The present inventor has disclosed and patented a number of patents to neck breaker assemblies; note such patents as U.S. Pat. Nos. 4,730,365, 4,619,071, 4,550,473 and 4,532,676. All of these patents are incorporated herein by reference. While these disclose and claim neck breaking assemblies, they do not include cropper removal means as in regard to the present device.

Furthermore, Tieleman in U.S. Pat. No. 4,610,050 discloses a probe for entering the torso of a chicken through a previously cut vent. The probe of Tieleman is supplied with sharp edges that have a tendency to lacerate the contents of the chicken thereby spilling the contents of the crop and other viscera into the abdominal cavity thereby infecting the inside of the chicken with bacteria.

SUMMARY OF THE INVENTION

The invention is to a system for processing poultry such as chickens, turkeys and various other birds that are or may be employed for human consumption. It also includes a module for accomplishing the intended purpose, said module may be replaced in a system as required. The system, then, includes a plurality of the said modules which are mounted in an endless fashion adjacent a conventional poultry processing line employing shackles on a horizontally disposed endless chain wherein the shackles are employed to carry defeathered partially processed chickens, for example.

The module is detailed to perform a plurality of operations during its course of travel the first part of which is in sequence with the travel of the poultry. The module performs the various operations due to appropriately positioned ca surfaces which together with rollers and power take off means drive each of the modules in turn through its designed paces.

As the poultry approaches the station of the present system each of the poultry in turn is grasped and thrust towards an individual module. The bird is in an upside position with its back side against the module. It is lifted upwardly under the leg portion between the legs and the carcass in a direction to abut against a loop ring. A hollow probe is thrust into the bird through a previously cut upwardly facing vent. The probe has a series of aligned descending openings through which a vacuum is imparted and at the same time the probe is rotated to essentially curl around the probe the viscera, i.e. crop, of the bird. The said openings on the probe have been detailed to be particularly effective in enmeshing the said viscera.

At the same time a roller mounted carriage thrusts the bird against a receiving block having a vertical slot into which the neck of the bird extends and is thrust thereinto. The said carriage also impinges upon a lever which carries at the end thereof an anvil which is thrust against the downwardly hanging neck of the bird approximate the carcass thereof. At the same time as the module traverses its route another pivotted lever is thrust forwardly. This lever has mounted at its end thereof a rather sharp projection detailed to break the neck of the bird. The levers are suitably dimensioned whereby the sharp projection is opposite the anvil when they are in their respective operative positions and the neck of the bird is therebetween.

When the entwining of the viscera onto the broke has been completed, while the module and birds have been successingly traversing the processing station, the probe is withdrawn from the bird through the vent carrying the crop on and about the probe. The neck of the bird is broken as the sharp projection and anvil sandwich forcefully the bird's neck therebetween.

As the modules reach the end of their traverse they move away from the poultry processing line freeing up the individual birds serially. The modules move to the backside of the station, the crop is removed from the probe and the probe is given a cleaning from a water spray while the probe is rotated counterclockwise against bristles of a unique brush.

The modules are then brought around again to face the poultry processing line for repeated utilization in an endless fashion.

BRIEF OF THE DRAWINGS

FIG. 1. is a perspective view of the present invention showing a series of modules along a working line.

FIG. 2. is a perspective view of a single module.

DETAILED DESCRIPTION

It should be noted at this outset, that the neck breaker and cropper removal assembly of the present invention is adapted to be mounted on a support module that is mounted together with other support modules on a conveyor line adjacent to the path of a poultry processing line. The structure of the conveyor and its drive assembly are well illustrated and disclosed in U.S. Pat. No. 4,532,676, and as such will only be briefly discussed as it relates to the improved cropper remover and improved neck breaker assembly to which the present invention is directed.

Figure 1:
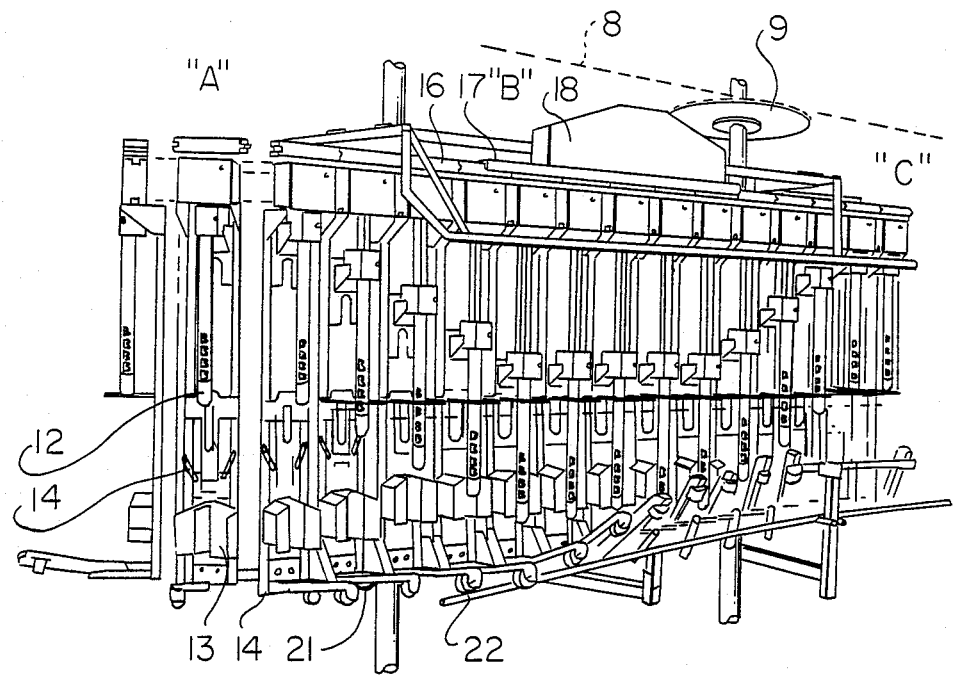

As, illustrated in FIG. 1, a plurality of individual modules 11 are aligned adjacent an endless chain 8, shown by a dotted line, which carries conventional shackles, not shown, each of which carries a chicken or other poultry. The poultry is supported by its legs in an upsidedown manner with the back side of the chicken presented to each module.

The modules 11 are driven by suitable and conventional means through large gear take off means 9 and form together an endless chain sub-assembly or station. The modules are driven from left to right in the representation and front side shown. On the rear side of the sub-assembly, the modules are moved from right to left and then back around again to the front.

Some salient points bear further discussion before getting into the details of the invention. As the module comes around from the back, it is shown in position "A" in FIG. 1, at which position a hanging-shackled chicken, not shown, is presented with its back to the module 11. The probe 12 is in a completely upward position so that the chicken may be positioned therein against block 13.

As module 11 moves from left to right in tandem with the chicken, probe 12 is rotated clock-wise and is seen to move downwardly to enter the vent opening that has been previously cut in the chicken. At the same time the block 13 moves upwardly. Arms 14 move upwardly to grasp the chicken at its bottom side between its legs and torso and to raise it in compression against U-shaped ring 15, seen more clearly in FIG. 2.

At position "B", the probe 12 is at its lowest descent. The module 11 is connected to flat plate 16 which has a bore 25 therethrough as seen from FIG. 2. Each of the modules has the flat plate 16 at the top thereof. They have a tongue on one end and a groove at the other end whereby they are fittingly joined essentially as an endless belt and move in a continuous sliding manner. As the modules are driven forward each of the said flat plates 16 moves into a downwardly facing open trough 17 which is connected to a large vacuum chamber 18. As there is a direct tubular connection for the flat plate 16 into the probe 12 a vacuum is applied through unique detailed openings 20 (see FIG. 2 for details) in the probe whereby the cropper and other items in the chicken may be grasped or snared for exiting and removed.

At the same time a lower carriage 21 is directed arcuately upwardly by cam surface 22 in impingement with the side of the chicken. The carriage also has an anvil 14 that is moved arcuately upwardly simultaneously against the neck of the chicken. At position "C" a neck breaker 23 is thrust forward to strike the neck and onto the anvil.

As the modules continue in their path, the lower carriage 21 is permitted to gravitationally gradually fall back towards a more horizontal position while the probe 12 continues to rotate clock-wise as it is simultaneously withdrawn from the chicken's body cavity with the contents thereof aforementioned.

As the module continues its trip to the other side of the sub-assembly as shown in FIG. 1, the chicken which has now been freed continues on its path for further processing at additional downstream stations. The probe 12 carries the cropper wound thereabout. As the module comes to the backside the probe 12 descends again into an extended position and enters an elongated spray washing zone, not shown, in FIG. 1 at the same time the probe is rotated in a counter clockwise position against a multiplicity of wiping angled plastic strands, the combination of which rids the probe of the unwanted material.

Figure 2:
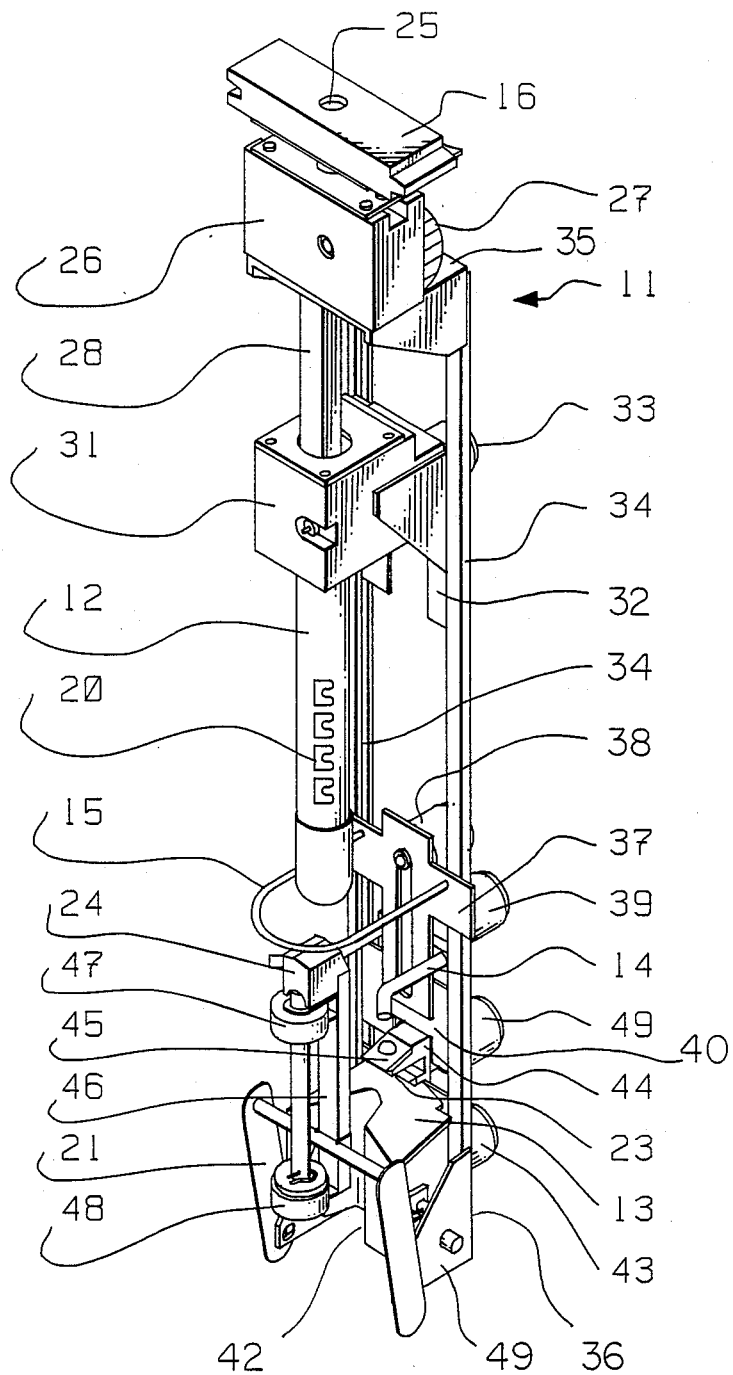
Figure 3:
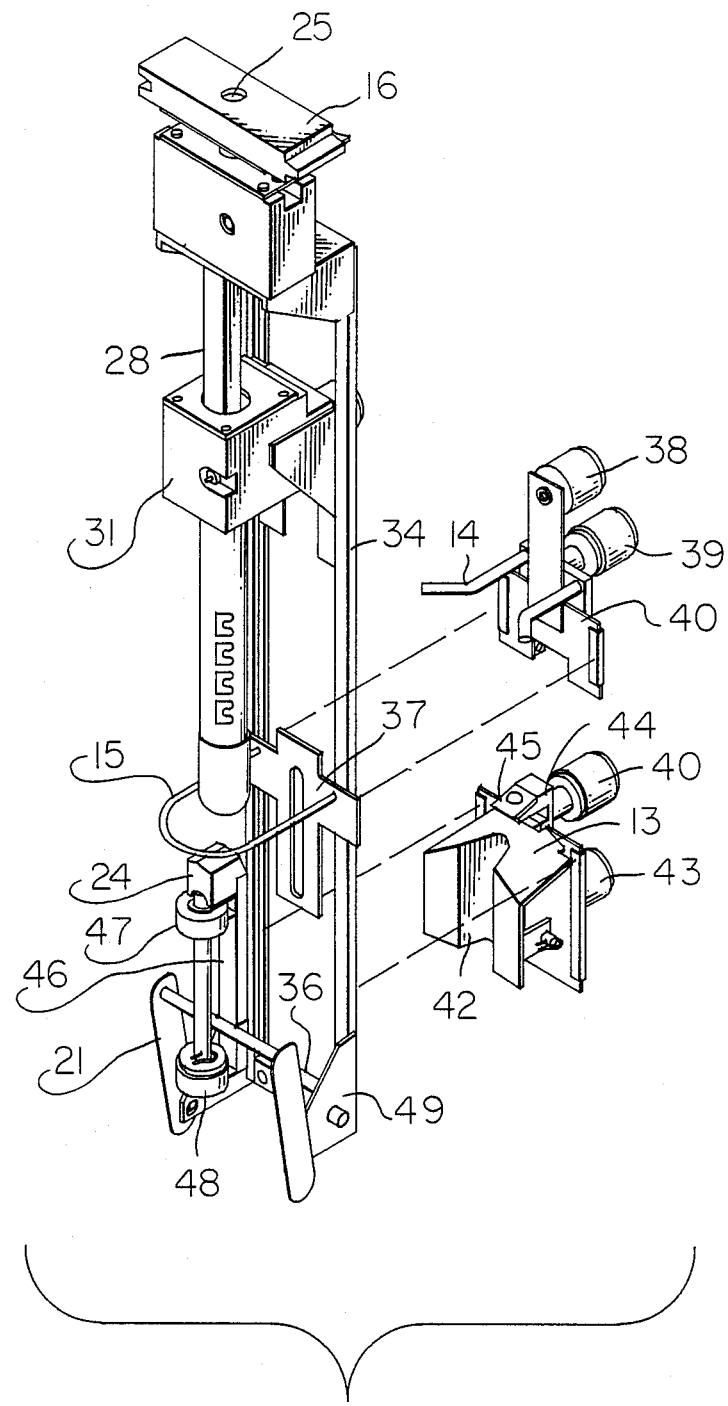
FIG. 3 is the same perspective of the module as in FIG. 2 but two components have been exploded away therefrom, namely the cam driven chicken lifter above the neck breaker cam driven part.
Figure 4:
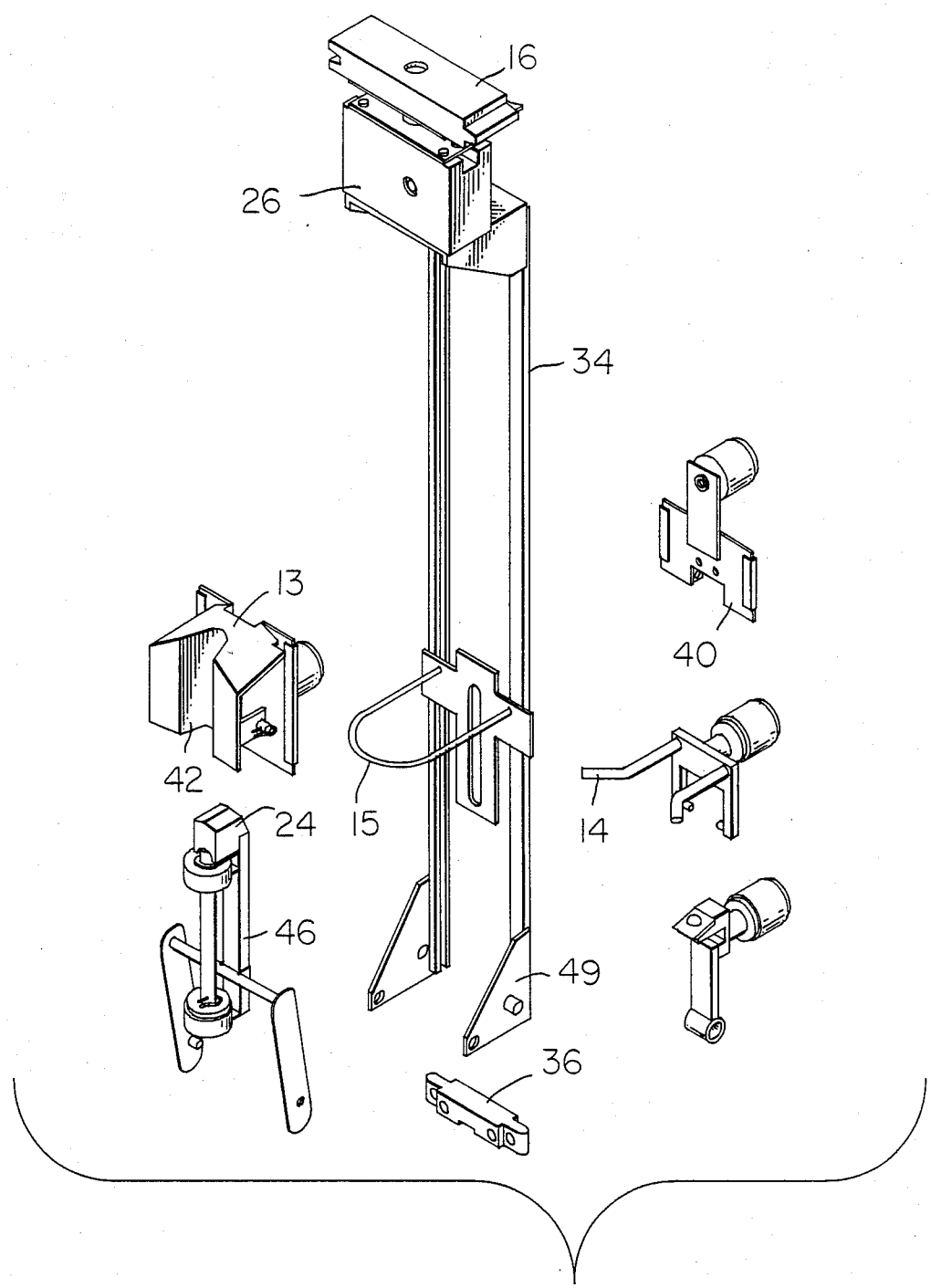
FIG. 4 is a further exploded view of the module in the same perspective view as in FIG. 2 showing only some of the components.
Figure 5:
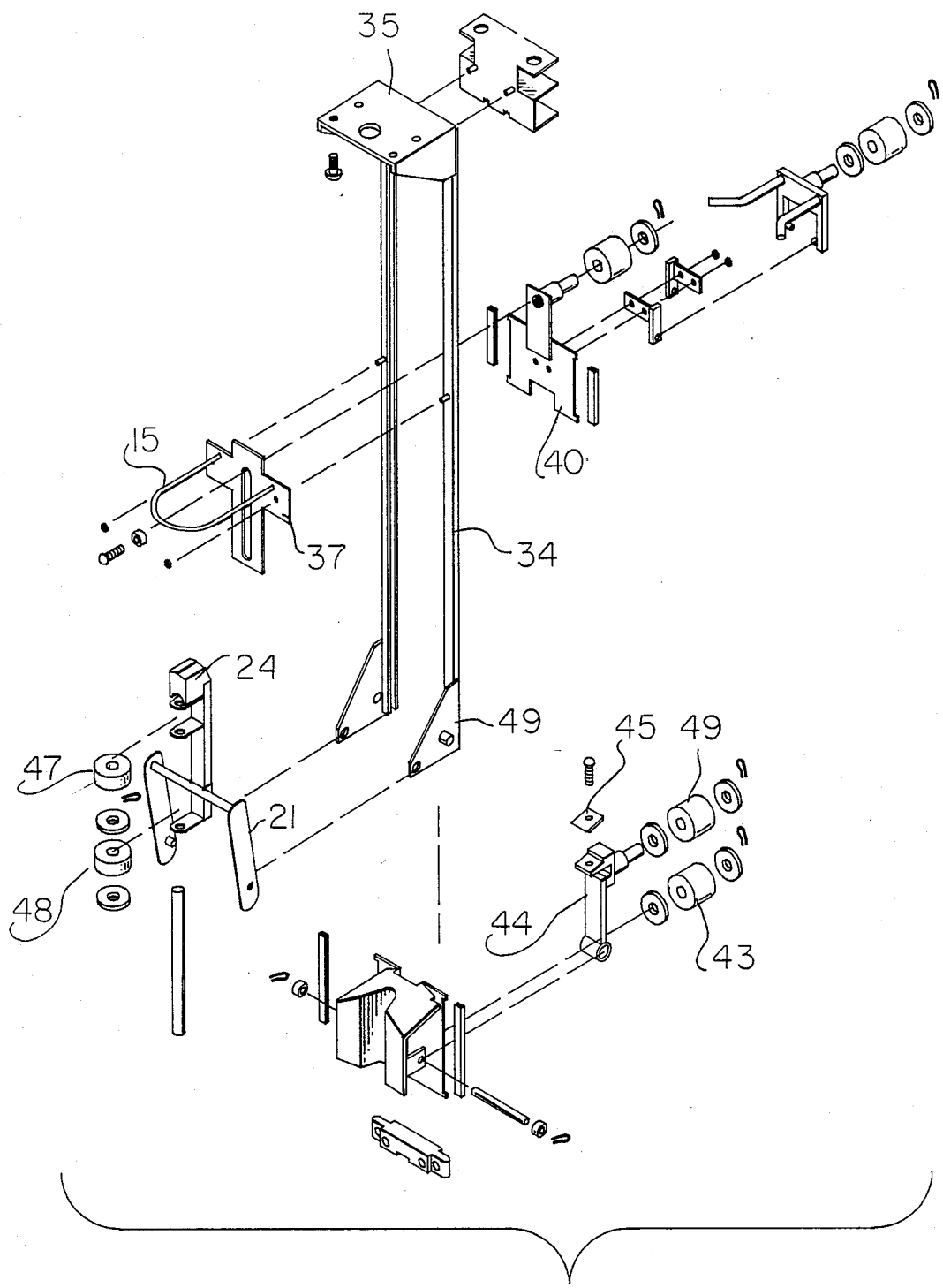
FIG. 5 is another even more detailed further exploded view of the module in the same perspective view as in FIG. 2.

For a better understanding of the invention, attention is now directed to FIGS. 2–5 for a review of the details of the module 11, as at FIG. 2, with a further direction to the subsequently numbered FIGS. 3–5 for an even more detailed consideration of the component parts.

Figure 9:
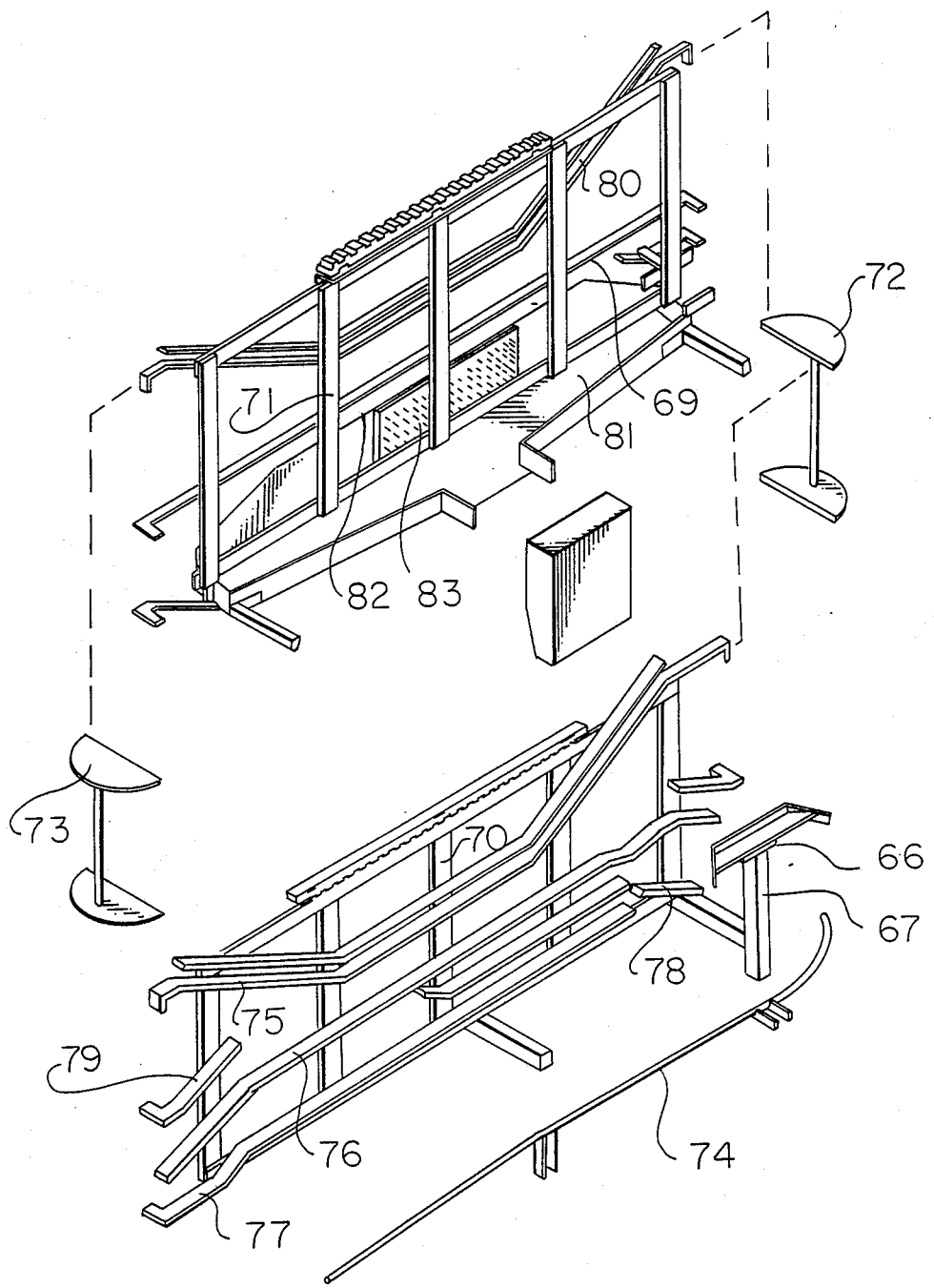
FIG. 9 is part of the support frame for the modules in partial fragmentary form and partly in exploded form showing the cams for operation of the modules.

Starting from the top down, the flat plate 16 can be seen with a vertical bore 25 therethrough, the bore is in axial alignment with a bore, hidden from view here, in fixed gear block 26. Suitable gearing is provided to take the rotational energy imparted to small gear wheel 27 into the block and change its direction of rotation from the horizontal to the vertical whereby square tube 28 is rotatable both in a clockwise manner or to the opposite thereof dependent upon the rotation given to gear wheel 27 by a rack 30 and 29 seen FIG. 9. The appropriate direction of travel is given by racks 30 and 29 which sits facing in one direction for the modules 11 when traversing the front and is facing in the other direction when the modules 11 are being cleansed of their debris as can be seen from FIG. 9.

The square tube 28 both drives to rotate the probe 12 and also carries the vacuum to the openings 20 of the probe 12. The probe is mounted to probe retaining block 31 which in turn is mounted on vertically slidable slide 32. The positioning of the slide 32 is dependent on roller 33 which rides on suitably positioned cam rail surfaces as will be explained in more detail in connection with FIG. 9. The slide 32 rides in between the vertically disposed grooves of rails 34. The rails are mounted at the top by a support plate 35 and at the bottom by another support plate 36.

The U-shaped ring 15 is perpendicularly mounted to a plate 37 which bridges and is mounted to the rails 34. The previously mentioned chicken support arms 14 are mounted to a slide 40 on one side thereof and a cam surface responsive roller 41 is mounted on the other side thereof whereby the arms may move vertically. The arms 14 are mounted on the upper end portion on one side of a pivotal lever which is hingedly mounted on the slide 40. A roller 38 is positioned on the upper end portion on the opposite side of the arms whereby said roller is responsive to a cam surface to embrace the chicken and to dislodge it after processing by the module of the instant invention.

Vertically therebelow is the block 13 which has a neck engagement groove 42. This block 13 is also slidably mounted on the rails 34 and moves vertically in response to a roller 43 which rides on an elongated cam surface, as discussed in connection with FIG. 9.

Above block 13 is the neck breaker 23 consisting of a horizontally pivotable carrier 44 which is topped off with a neck breaker blade 45. The axis of the pivot is in the same direction as the travel of the module.

On each side of the two rails 34 are flat plates 49 mounted along one edge of each of them, extending outwardly perpendicularly from the rails 34. At the outermost end portion the hinged lower carriage 21 is mounted. The aforementioned anvil 24 is mounted on a pivotably mounted lever 46 which pivots in tandem with the lower carriage 21. Pivotting is effected by lower roller 48 which rides on an appropriately positioned cam surface. The final thrust to the lever is given by roller 47 which rides a short cam surface.

Having garnered an overall view of the module 11, it is now incumbent to treat the various essential parts thereof for an even better understanding.

Figure 6:
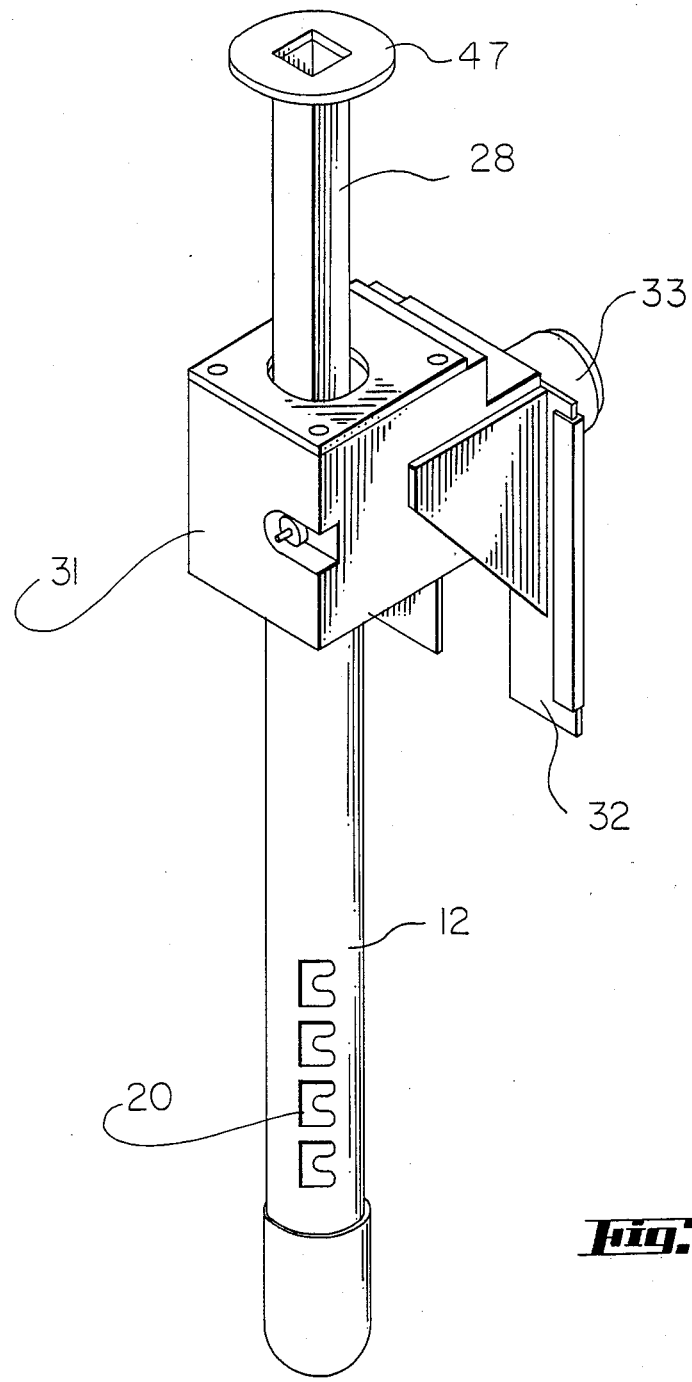
FIG. 6 is a perspective view of the cropper removing probe of invention.
Figure 7:
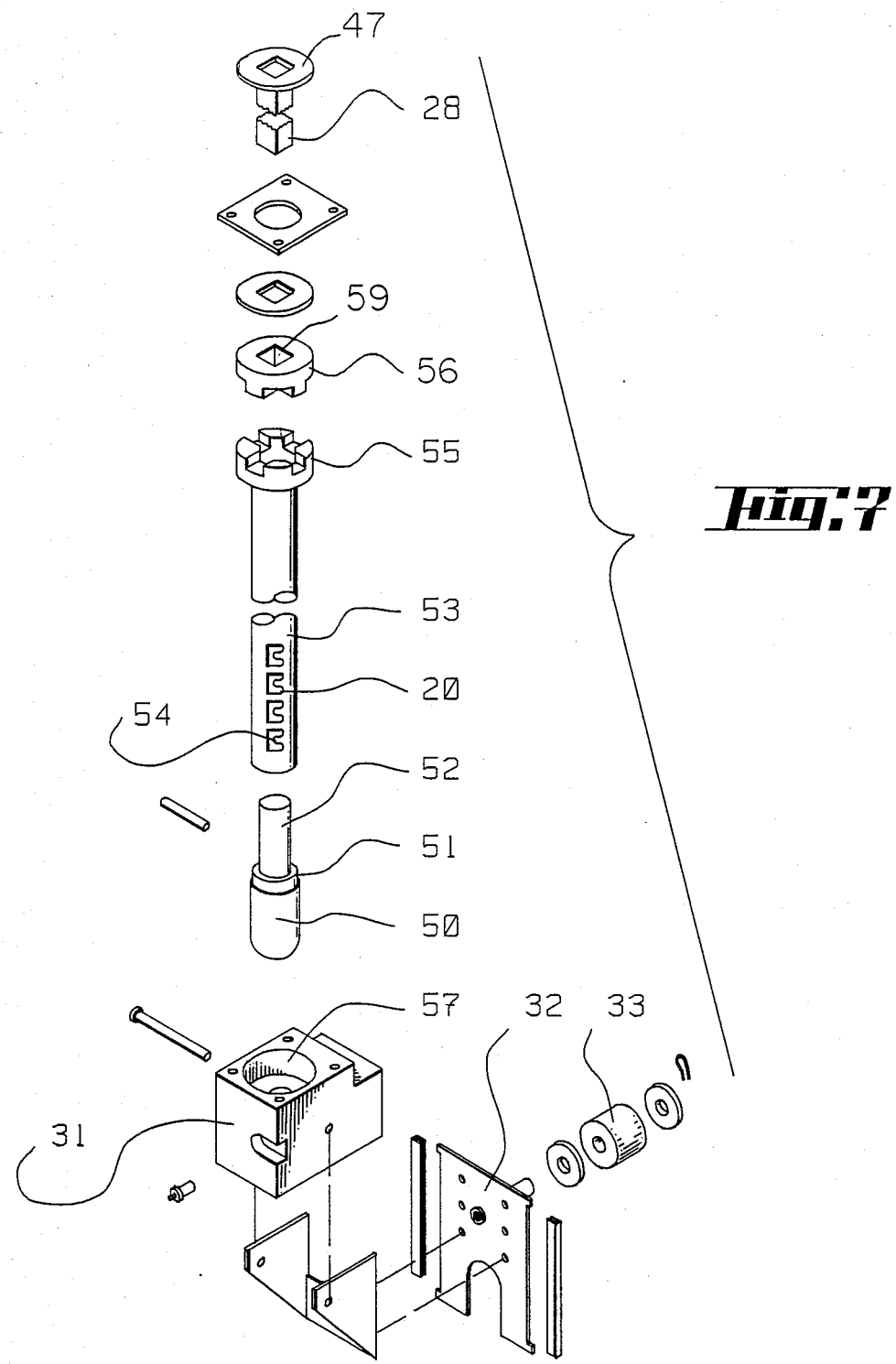
FIG. 7 is an exploded view of the probe assembly of FIG. 6.
Figure 8:
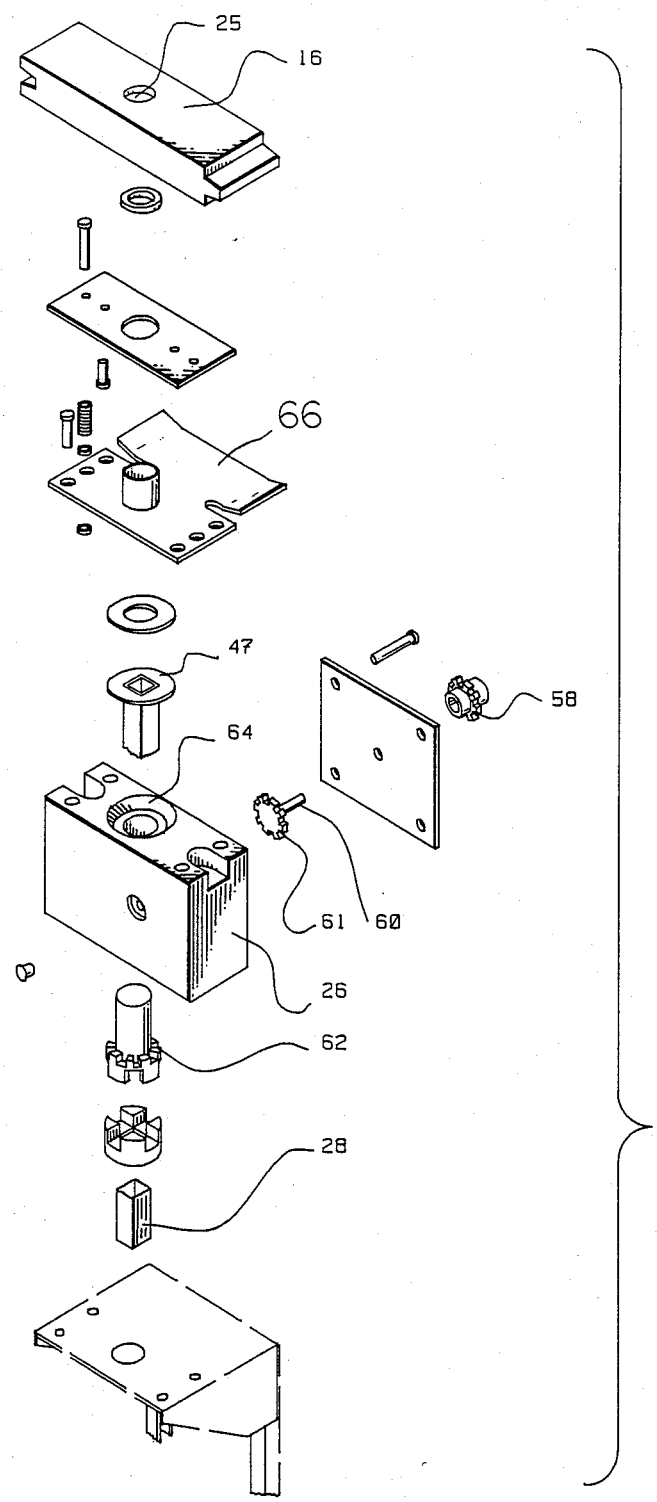
FIG. 8 is an exploded view of the uppermost portion of the module showing the component for the vacuum connection.

Having considered the module 11 with a great deal of specificity, attention is now directed to FIGS. 6 and 7 for a detailed consideration of the specifics of the probe 12. As probe 12 is driven downwardly as it details its operative formation it is mounted, as has been previously stated, on probe retaining block 31. The square tube 28 is designed to rotate the probe 12 both clockwise and counterclockwise in response to its own directional impetus. The said square tube terminates with radially extending flange 47 in fixed block 26 see FIGS. 2 and 8.

The probe 12 terminates in probe retaining block 31 and is journalled therein. The probe 12 terminates at its distal end with a plastic nose end 50 which has a shoulder portion 51 and has extending neck portion 52 of considerably less diameter than the tube 53 whereby it extends into the tube 53. The top of the neck portion 52 acts as a stop for the square tube 28. The outer diameter of both tube 53 and nose end 50 are the same thereby giving a smooth continuous surface.

The tube 53 has a series of openings 20 in several axial spaced rows. Each of the openings has a short finger 54 jutting thereinto, all in the same direction whereby the probe has a combining enmeshing effect when rotated clockwise and a tendency to dislodge any debris when rotated counterclockwise.

The tube 53 terminates at its upward reaches in a flange coupling 55 which is situated in a suitably detailed well 57 in probe retaining block 31. The coupling 55 is mated with downward facing member 56 which is adapted and constructed to drive the lower coupling 55. The member 56 has a square hole 59 whose dimension is designed to engage the square tube 28 and is driven thereby which in turn rotates coupling 55 and thereby the probe 12.

Having adequately discussed the probe 12, attention is now directed to the mechanism for imparting the necessary rotational forces to the square tube 28 and the means for putting the square tube 28 and tube 53 under vacuum conditions. Accordingly, attention is directed to FIG. 8. The fixed block 26 contains the aforementioned device coupling which consists of sprocket gear 58 which rotates on a horizontal axle 60. The said sprocket gear 58 operatively engages a first rack on the side for processing the poultry and then engages a second rack on the other side when the probe is undergoing a cleansing and washing step. It will be appreciated that the positioning of the respective racks depends upon whether the station is processing a moving line of poultry, in one direction or is in another direction on the module's return leg. The axle 60 has operatively attached to it a horizontal bevel gear 61 which is located internal of fixed block 26 and engages vertical gear 62 also internal of the fixed block 26. The gear 62 is coupled to a coupling 63 which has a square hole to accommodate the square tube 28; thereby transmitting horizontal rotational power to vertical.

The fixed block has a shallow well 64. The square tube 28 terminates in the well 64 and is fitted with a sealing flange 47. A plate 66 overrides the block 26 and said flat plate 16 overrides the plate 66. Suitable couplings and spring inhibits loss of vacuum obtained when flat plate 16 is passing through said aforementioned vacuum chamber 18. It will be recalled that bore 25 is the exit for degassing and as the square tube 28 is in axial alignment with bore 25 and open thereto at both end portions thereof, the square tube 28 is subject to the vacuum. As square tube is internal of the probe 12 tube 53 itself is subject to degassing through openings 20.

Having discussed the component parts it is now incumbent to treat the details of the camming surfaces. The cam surfaces are attached to a front frame 70 and to a rear frame 71. They are connected by a first end piece 72 and a second end piece 73. The front frame has a cam surface rail 74. The front rail drives the lower carriage 21 arcuately upwardly to embrace the lower portion of the bird to clasp against block 13. As was said before the roller 48 is carried by cam 74 which raises the carriage 21. Then the final thrust for lever 46 is imparted when roller 47 rides on cam surface 66 mounted on an upright 67 which is part of frame 70. Cam surface rail 75 is designed to impinge on roller 33 to drive the probe 12 downwardly into the bird. Cam surface rail 79 is designed to carry roller 38 whereby the arms 14 raise the bird up against U-shaped loop 15. Roller 41 rides on cam 76 to pivot arms 14 in embracing engagement of the poultry. Cam surface rail 77 carries roller 43 to move block 13 upwardly to a small extent. Roller 49 is picked up by short cam surface rail 78 which is operatively engaged to operate the neck breaker 23.

Figure 10:
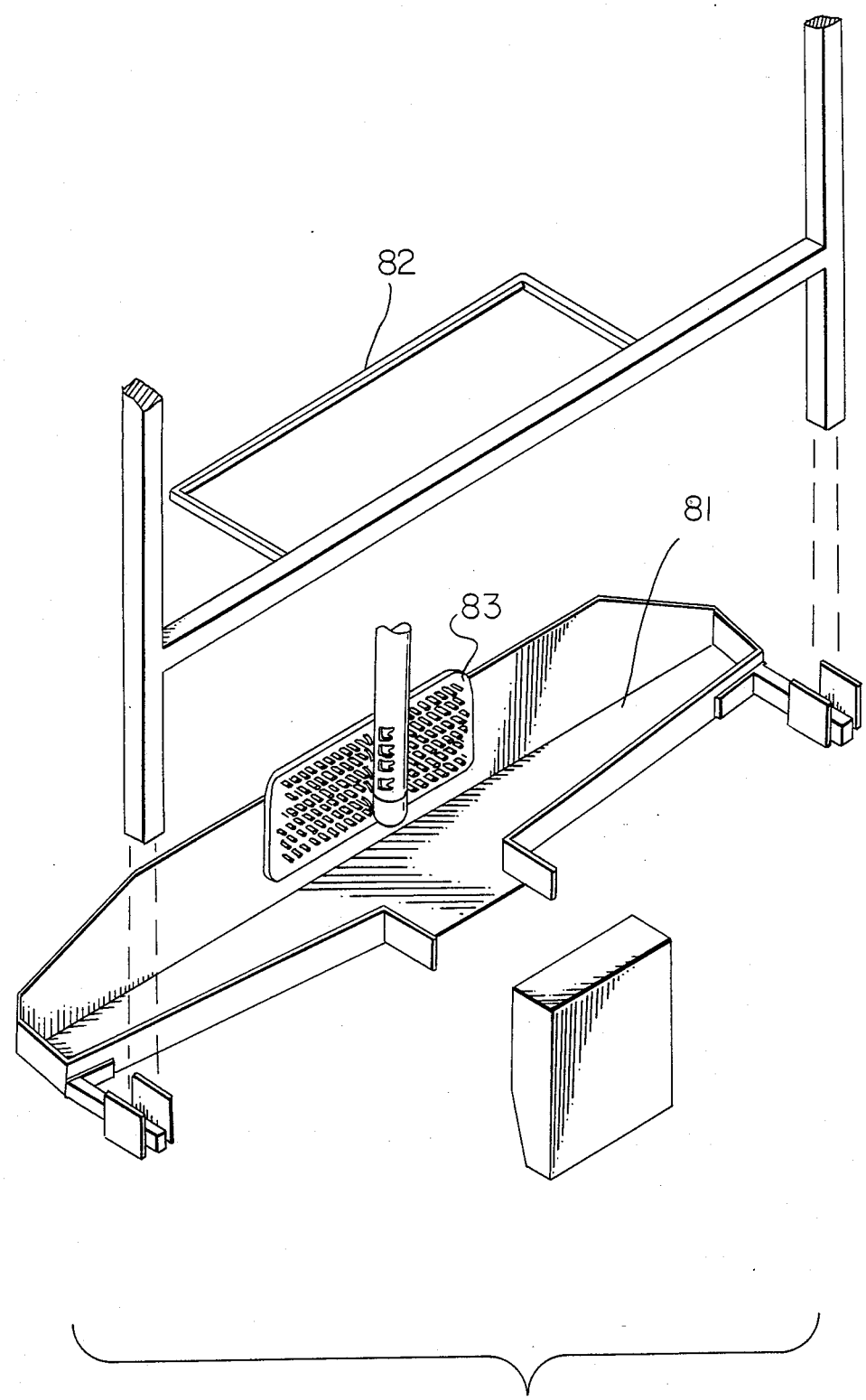
FIG. 10 is a fragmentary view of the trough showing the cleaning bristles of the brush.

On the rearside the rails 69 for the rollers are to stabilize the module 11 except for the rear cam surface rail 80 which carries roller 33 to again drop the probe 12 downwardly into the cleansing trough 81 which has conventional drain means and a series of well placed spray nozzles 82 to be effective. At the same time the probe passes against a vertically positioned brush 83 which is mounted adjacent the backboard of the trough 81, see FIG. 10 for more details, and note the 45° downwardly positioned individual bristles 83 which achieve an effective cleansing wiping action across the surface of the probe as the probe is rotated in a counterclockwise direction as it traverses the station.

The processing station is constructed of stainless steel to avoid any rust buildup. The modules are also constructed of stainless steel expect for the rollers and the blocks which are constructed of a hard plastic such as dieldrin. The bristles of the brush are also constructed of a fairly rigid plastic material.

What is claimed is:

1. A poultry combination neck breaker and cropper assembly capable of use in conjunction with horizontally disposed processing line for upside down positioned poultry having an upwardly facing vent and are carried by their legs in shackles which are secured to an endless conveyor, said assembly including a module having a vertically disposed support frame, means for mounting said support frame for horizontal movement on said assembly in tandem with said processing line and adjacent thereto, said module including a vertically reciprocatable and rotable tubular probe having a plurality of radially extending openings, said module having means for reciprocating said probe into and out of a poultry through said vent, means for rotating said probe, whereby when said probe is in said poultry it becomes entwined with the cropper of the poultry and withdraws and removes same from the poultry when the probe is moved upwardly and out of the poultry, said module having a block, said module having an arcuately movable carriage, means for pivoting said carriage in a direction towards said block, said block and said carriage adapted and constructed to sandwich said poultry therebetween, said carriage having a projecting anvil, adapted and constructed to abut against a neck portion of said poultry, said module having a pivotally mounted neck breaker lever, means for pivoting said neck breaker lever in the direction of said poultry neck in the region thereof in abutment with said anvil whereby to therebetween break said neck, said assembly including means downstream for cleaning said probe of poultry debris removed from the poultry and means for returning said module for reuse in said processing line.

2. The poultry combination neck breaker and cropper of claim 1 wherein said module includes vertically movable means adapted and constructed to support said poultry and to move it upwardly against an abutment, said abutment being apertured whereby said probe may move therethrough.

3. The poultry combination neck breaker and cropper of claim 2 wherein said means for rotating said probe includes means for selectively rotating said probe either in a clockwise or a counterclockwise manner.

4. The poultry combination neck breaker and cropper of claim 3 wherein said module includes a sliding plate means having a bore therein, a vacuum chamber, said plate means adapted and constructed to enter said vacuum chamber and through its bore to be attached to said vacuum source, said bore further communicating through means to said probe.

5. The poultry combination neck breaker and cropper of claim 4 wherein the openings of said probe have a U-shaped horizontal configuration.

6. The poultry combination neck breaker and cropper of claim 5 wherein the means for cleaning said probe includes a horizontally disposed brush mounted to abut against the area of the openings of the probe when said probe is moved there across, said brush having individual bristles which extend downwardly at an acute angle from the vertical whereby to achieve a wiping action.

7. A module for breaking the neck of poultry and for removing the crop and other viscera of poultry comprising an elongated frame, slide means mounted on said frame adapted and constructed for reciprocatable movement axially along said frame, a tubular probe means, said tubular probe means having its proximate end portion mounted on said slide means, said tubular probe having a plurality of openings along its distal end portion, means for driving said slide means in one direction in a first mode, and in the opposite direction in another mode, drive means for rotating said tubular probe means in one direction when in one mode and in the other direction when in another mode, means for operatively attaching said tubular probe means at its proximate end portions to a vacuum source, block means disposed on said elongate frame and axially spaced from said tubular a first probe means, a first lever, means pivotably mounted at one end on said frame and on one side of said block, said lever means having a neck breaking striking element positioned at its other end, a second lever means pivotably mounted at one end on said frame and on the other side of the block, said second lever means having an anvil at said other end, drive means for pivoting said first lever and said second lever towards each other whereby they forcefully strike a neck of poultry when sad module is in use thereby breaking said neck therebetween.

8. The module of claim 7 including a pivotable carriage means mounted on said frame along the bottom portion thereof, drive means to pivotally move said carriage means in a direction of said block means thereby to clamp a poultry therebetween when said module is employed.

9. The module of claim 8 including a second slide means mounted on said frame, drive means to reciprocatingly axially move said slid means, said slide means having support means to cradle a poultry when said module is in use.

10. The module of claim 9 wherein an apertured abutment is positioned on said frame and said probe is adapted and constructed to axially describe a path through said aperture, said abutement positioned to clamp a poultry between it and the said second slide means when said second slide means is driven in one direction.

11. The module of claim 10 wherein the block has an axially positioned slot adapted and constructed to at least partially embrace a neck of a poultry when said module is employed.

12. The module of claim 11 wherein said abutment has a U-shaped ring configuration.

13. The module of claim 12 wherein said means for attaching said probe to a vacuum source include a flat plate slide having a bore therethrough, said flat plate slide adapted and constructed to engage a vacuum source when said module is employed, said bore being fluidly connected to said probe.

14. A module for removing the crop and other viscera of poultry comprising an elongated frame, slide means mounted on said frame adapted and constructed for axial reciprocating movement, a tubular probe means, said tubular probe means having its proximate end portion mounted on said slide means, said tubular probe having a plurality of openings along its distal end, means for driving said slide means in one axial direction in a first mode and in the opposite direction in another mode, drive means for rotating said tubular probe in one direction when in one mode and in the other rotation when in another mode, means for operatively attaching said tubular probe means at its proximate end portion to a vacuum source.

15. The module of claim 1 wherein the openings of said tubular probe means describe a U-shaped configuration perpendicular to the axis of said tubular probe means.

16. The module of claim 14 wherein the openings of said tubular probe means describe a U-shaped configuration perpendicular to the axis of said tubular probe means.

* * * * *